United States Patent [19]

Woolston

[11] 4,151,403
[45] Apr. 24, 1979

[54] CONTROL SYSTEM FOR AN UNWINDING ROLL

[75] Inventor: Allan B. Woolston, Wynnewood, Pa.

[73] Assignee: Molins Machine Company, Inc., Cherry Hill, N.J.

[21] Appl. No.: 839,680

[22] Filed: Oct. 5, 1977

[51] Int. Cl.² .................... G06M 3/02; B65H 19/08
[52] U.S. Cl. .................... 235/92 DN; 235/92 CT; 235/92 CP; 235/92 DP; 235/92 R; 242/57; 242/58.1; 364/562
[58] Field of Search ........ 235/92 DN, 92 CT, 92 CP, 235/92 DP; 242/186, 57, 201, 58.1; 364/562, 468, 470

[56] References Cited

U.S. PATENT DOCUMENTS

| | | | |
|---|---|---|---|
| 3,834,648 | 9/1974 | Rose et al. | 235/92 DN |
| 3,953,713 | 4/1976 | Ligt | 235/92 DN |
| 4,001,562 | 1/1977 | McEnery | 235/92 DN |
| 4,086,470 | 4/1978 | Ashbee | 235/92 DP |

Primary Examiner—Joseph M. Thesz
Attorney, Agent, or Firm—Seidel, Gonda, Goldhammer & Panitch

[57] ABSTRACT

An optical encoder generates a train of digital pulses as a function of the length of web material unwound per revolution of an unwinding roll. A counter counts the encoder pulses for each revolution of the roll. The counts of the encoder pulses are accumulated over a first set of revolutions of the roll. A programmed microprocessor effects a base computation of (1) the average change in the number of pulses generated per revolution of the roll and (2) the length of web remaining on the roll after the first set of revolutions. Thereafter, the base computation of web length is updated at each revolution of the roll. The counter may comprise an addressable hardware counter chain alone or in combination with a read/write memory which counts the number of times that the counter chain overflows.

17 Claims, 6 Drawing Figures

CONTROL SYSTEM FOR AN UNWINDING ROLL

BACKGROUND OF THE INVENTION

The present invention is directed to a control for a device associated with an unwinding roll of web material. In particular, the invention is directed to a control which continuously monitors the length of material on the unwinding roll. The invention is particularly suited for use in an automatic splice control system for a web splicer apparatus which includes at least one unwinding (running) web roll and one stationay (ready) web roll and a splice mechanism for splicing the running web to the ready web.

Control systems for monitoring the level of wrap on a running roll are well known in the art. See co-pending patent application Ser. No. 791,095, now U.S. Pat. No. 4,089,482, entitled "Automatic Web Splice Control System" assigned to the assignee herein and the art listed in the application.

The present invention concerns a pioneering design of a control system for a device associated with an unwinding web roll. The invention utilizes modular state-of-the-art microcomputer components. It is fully automatic. The control exercised by the system is adaptable. The control can be altered readily to suit the particular requirements of an application by modification of the system software.

An advantage of the invention is that it effects fully automatic monitoring of the level of wrap on an unwinding roll.

Another advantage of the invention is that it is modular and employs readily available integrated circuit components which are easily interchanged to facilitate repair.

A further advantage of the invention is that it provides extremely adaptable control of a large variety of production apparatus which may be used in association with an unwinding roll.

Other advantages appear hereinafter.

SUMMARY OF THE INVENTION

Apparatus for continuously determining the length of web remaining on an unwinding roll, comprising first means for generating a train of digital pulses representative of the length of web unwound per revolution of the roll; second means operatively associated with the first means for accumulating successive counts of the pulses over a predetermined number of revolutions of the roll; third means operatively associated with the second means for computing the average change in the number of pulses generated per revolution of the roll over a predetermined number of revolutions of the roll and for computing the length of web remaining on the roll after each revolution thereof based on the computed average change and the accumulated count.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIGS. 5 and 6 comprise an electrical schematic of the interrupt interface.

DETAILED DESCRIPTION OF THE INVENTION

Figure 1:
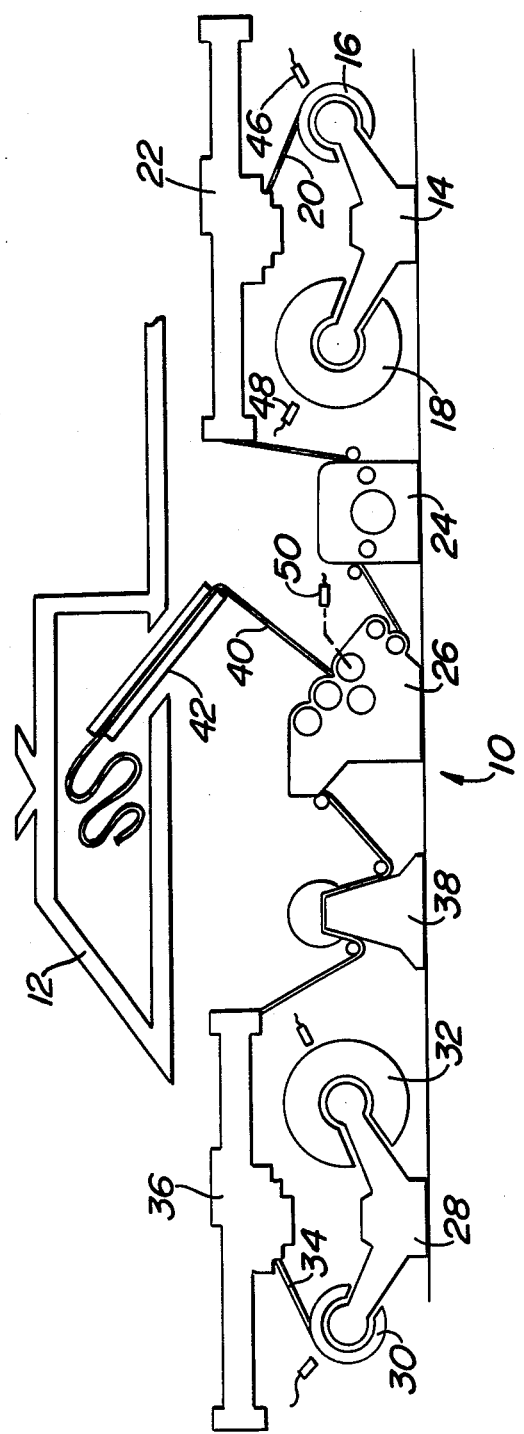
FIG. 1 is a diagrammatic representation of a portion of a corrugator machine.

Referring to the drawings in detail, wherein like numerals indicate like elements, there is shown in FIG. 1 a portion of a corrugator machine supervised by the control system of the present invention. The corrugator machine includes a single facer system 10 and a bridge 12. Although the invention is disclosed hereinafter in terms of control of a portion of the corrugator machine, it should be understood that the invention is broadly directed to a control for any device operatively associated with an unwinding roll. The invention is not limited to the machinery associated with the roll nor the particular material on the roll.

The single factor system 10 includes a first mill roll stand 14 for supporting a running roll 16 and a ready roll 18 of web or liner 20. The liner 20 is fed through a web splicer apparatus 22 such as that described in co-pending application Ser. No. 791,095 entitled "Automatic Web Splice Control System" assigned to the assignee herein. The splicer apparatus 22 is adapted to splice the liner from ready roll 18 to the liner from running roll 16 without retarding continuous operation of the machinery downstream of the mill roll stand 14.

The liner is fed through a preheater 24 to the single facer machine 26. A second mill roll stand 28 supports running roll 30 and ready roll 32 of a corrugating medium 34. The medium 34 is fed through a splicer apparatus 36 to preconditioner 38. The preconditioned corrugating medium 34 is then fed to the single facer machine 26. The single facer machine corrugates the medium and adhesively bonds it to the liner 20 to form single faced paperboard 40. The single face paperboard is fed by a conveyor 42 to the bridge 12. Thereafter, the single faced paperboard is heated and fed to a double facer machine (not shown).

Control System Architecture

Figure 2:
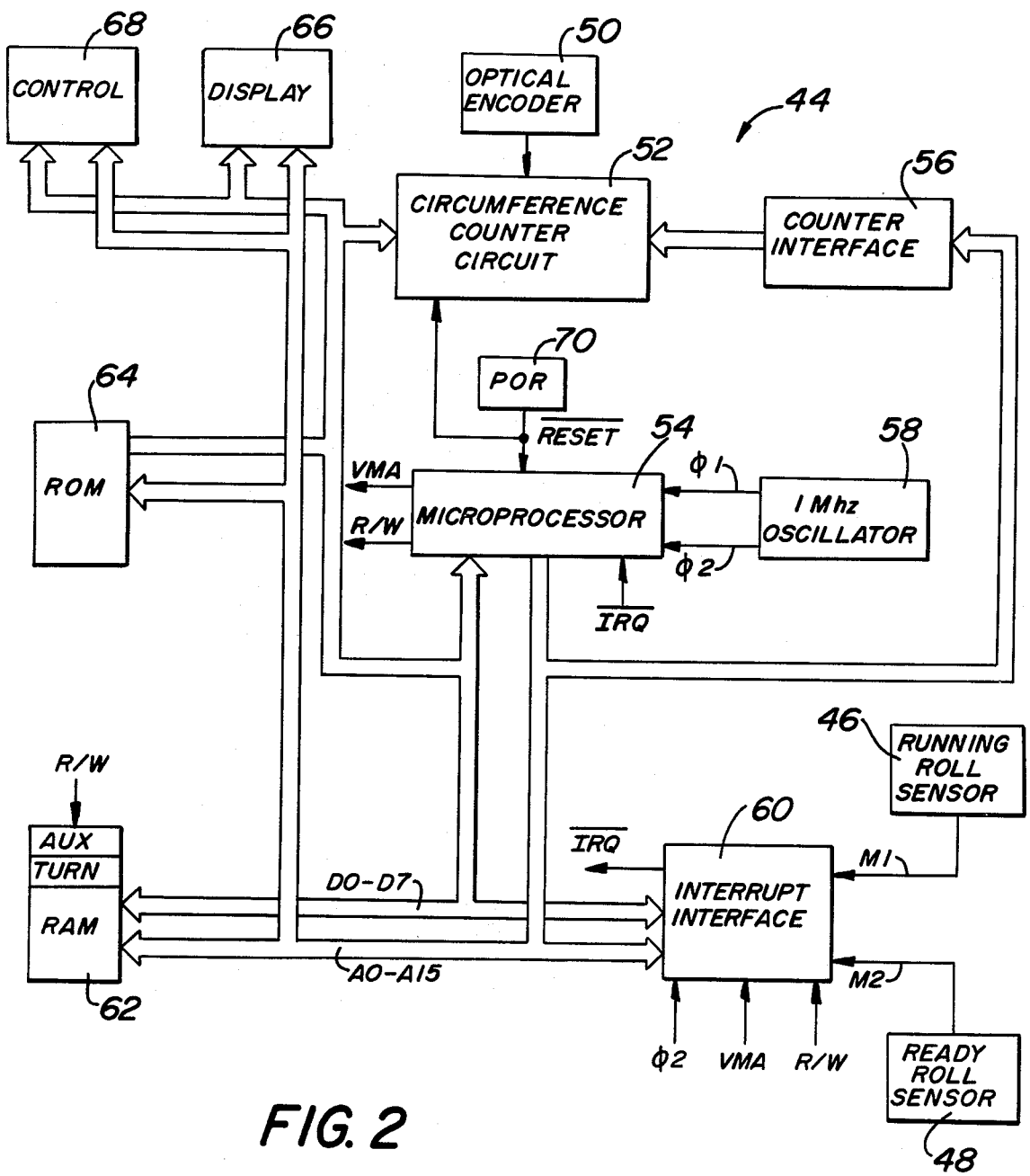
FIG. 2 is a block diagram of the invention.

In FIG. 2, there is shown a control system 44 for monitoring the length of liner 20 remaining on running roll 16 in accordance with the present invention. Depending on the length of liner remaining on the roll, the system 44 operates the splicer apparatus 22 to initiate a splice sequence. The control system 44 includes a pair of reluctance type sensors 46 and 48 respectively associated with running roll 16 and ready roll 18. See FIGS. 1 and 2. Each of the sensors generates a pulse output when its respective roll is running to indicate a complete revolution of its associated roll. System 44 also includes an optical encoder 50 associated with a drive shaft in the single facer machine 26. The optical encoder generates a train of digital pulses representative of the length of liner 20 unwound from the running roll and fed to the single facer machine. The encoder generates a pulse output for predetermined increments of travel of the unwound liner.

Control system 44 includes a circumference counter circuit 52. See FIG. 2. The circumference counter circuit is a hardware circuit comprising an addressable counter chain described more fully hereinafter. The counter circuit is addressed by a microprocessor 54 via an address bus A0-A15 and a counter interface 56. Preferably, the microprocessor 54 is a Motorola M6800 microprocessor. The microprocessor is driven by a 1 MHz oscillator 58 which generates a pair of non-overlapping clock signals 1 and 2. Oscillator 58 may be a Motorola MC6871A oscillator/driver.

The microprocessor 54 is an off-the-shelf item having well known operating characteristics. See "M6800 Microcomputer System Design Data" manual (Motorola Inc. 1976). The microprocessor is a bi-directional bus-oriented unit with dual byte addressing. The microprocessor includes a pair of accumulators, an index register, a stack pointer, a program counter and a 6 bit condition code register. The bits of the code register are used as testable conditions for conditional branch instructions. The structure and operation of each of these elements are well known. Further description herein is deemed unnecessary.

The address A0-A15 bus comprises 16 tri-state bus drivers which address the peripheral components in the control system 44. See FIG. 2. The peripheral components include the counter interface 56, an interrupt interface 60, a RAM 62, a ROM 64, a display 66 and a control circuit 68. Each of the peripheral components is treated by the microprocessor as a memory address. All of the components therefore are programmable via the address bus.

The control system 44 also includes a data bus D0-D7. The data bus is bi-directional; it transfers a byte of parallel data to and from the peripheral components.

The microprocessor 54 includes a read/write (R/W) line, a valid memory address (VMA) line and an interrupt request ($\overline{IRQ}$) line. The R/W line indicates to the peripheral components that the microprocessor is in a read or a write state. The VMA line indicates to the peripheral components that a valid address is on the address bus. The VMA signal is used to enable the interrupt interface 60 as described hereinafter.

The $\overline{IRQ}$ line indicates to the microprocessor that an interrupt routine should be executed. When the $\overline{IRQ}$ signal is generated, the microprocessor completes execution of the program instruction initiated prior to recognition of the signal, checks an interrupt mask bit in the condition code register to determine whether the interrupt routine can be executed and stores the contents of the index register, program counter, accumulators and condition code register on a push-down/pop-up stack in RAM 62.

The RAM 62 may be a Motorola MCM6810A memory. The RAM is organized in bytes. One of the bytes, designated TURN, is used to count the number of revolutions of the running roll 16 as described more fully below. Another byte, designated AUXILIARY, may be used to expand the capacity of the circumference counter circuit.

The ROM 64 may be a Motorola MCM6830A memory. The ROM is organized in byte fashion similar to the RAM.

The display 66 may be any suitable digital display having conventional decoding circuitry for driving the display elements in response to the data bus D0-D7.

The control circuit 68 may be any suitable circuit for initiating the operation of a machine functionally associated with the running roll in response to the D0-D7 data. For example, the control circuit can initiate the operation of the splicer apparatus 22.

Computation Of Length Of Web Remaining On the UNwinding Roll

When power is first applied to control system 44, a power on reset (POR) circuit 70 generates a Reset signal. The POR circuit may be a Motorola MC1455 restart circuit. The Reset signal causes the microprocessor to begin to reset sequence and clears an addressable counter chain 72 in the circumference counter circuit 52 via a NOR gate 74. See FIG. 3. Thereafter, the microprocessor 54 supervises the circumference counter circuit 52 and the other peripheral components as a function of the outputs of optical encoder 50 and sensors 46 and 48.

The microprocessor 54 is programmed to supervise the counter circuit 52 and the other peripheral components. The microprocessor performs an iterative computation of the length of web remaining on the running roll per revolution of the roll. The program instructions for supervising the components and performing the computation are stored in the ROM 64. The instructions are fetched and executed in sequence by the microprocessor. A sample program for effecting the computation of remaining web length on the running roll for the system architecture described herein is annexed hereto as an addendum. The program utilizes the instruction set for the MC6800 microprocessor.

The programmed microprocessor forms a part of the embodiment of the invention described herein. It should be understood, however, that the invention is not directed per se to the program. Nor is the invention directed per se to any algorithm computed under supervision of the program.

The counter chain 72 comprises cascaded hardware counters 76, 78 and 80. See FIG. 3. The counters may be four bit binary counters such as the TI SN74192 up/down counters operated in the up mode. The counter chain 72 counts the number of encoder pulses generated per revolution of the running roll. The encoder pulses are synchronized to the clock 2 pulses via an inverter 82 and a synchronizer 84. Synchronizer 84 may be a TI SN74120 synchronizer/driver. The counter chain accumulates or sums the counts over a predetermined number or set of revolutions of the roll. At the end of the set of revolutions, a base computation of the length of web remaining on the roll is made. In the preferred embodiment described herein, the base computation is effected after the first 17 revolutions of the roll. Thereafter, the base computation is updated for each subsequent revolution of the roll.

The base computation of the length of web remaining on the roll involves two separate but related calculations. The first calculation is the total length of web unwound from the roll over the first 16 revolutions. The second calculation is the average rate of change in the length of web unwound from the roll per revolution of the roll based on the first 17 revolutions of the roll.

To effect the first calculation, 16 consecutive revolutions of the running roll are marked by the pulse output, denoted M1, of running roll sensor 46. During the first revolution of the roll, counter chain 72 counts the number of pulses generated by the optical encoder. See FIG. 3. This provides a measure of the length of web unwound during the first revolution. At the end of the first revolution, a pulse appears at the M1 output of sensor 46. The pulse triggers a flip-flop 86 which generates an $\overline{IRQ}$ signal via an inverter 88 at the interrupt interface 60. See FIG. 5. Inverter 88 may be a TI Sn7405 inverter with open-collector output. Flip-flop 86 may be a D-type edge triggered flip-flop such as the TI SN7474 flip-flop. The $\overline{IRQ}$ signal causes the microprocessor to enter one of two interrupt routines designated TIME or ROLL based on the $\overline{D0}$-$\overline{D2}$ outputs of the interface 60 as described more fully hereinafter. For the first 16 revolutions of the roll, the $\overline{IRQ}$ signal causes the microprocessor to enter the ROLL interrupt routine.

Figure 4:
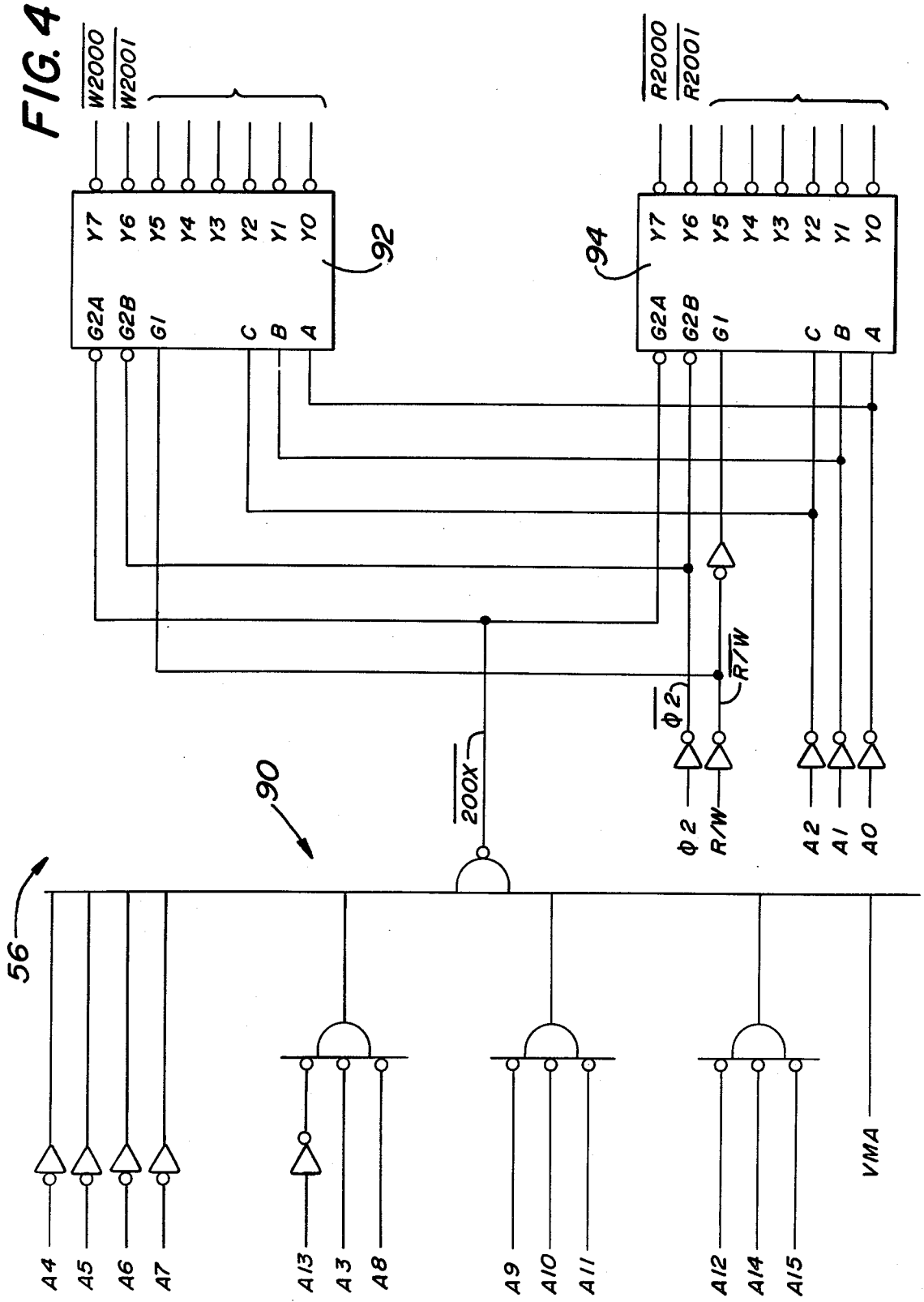
FIG. 4 is an electrical schematic of the counter interface.

In the ROLL interrupt routine, the microprocessor addresses the counter interface 56 via address bus A0-A15 and the VMA line. See FIG. 4. The counter interface decodes the address by means of gating logic 90 and a pair of decoders 92 and 94. The decoders may be TI SN74S138 decoders. Gating logic 90 detects the HEX address $\overline{200X}$, where X is a don't care symbol for bits A0-A2. Bits A0-A2 and the R/W signal then determine which one of four HEX addresses will be generated at the decoder outputs. Operation of the counter interface 56 is summarized in Table 1 below.

Table 1

| A0 | A1 | A2 | R/W | Output (Hex) |
|---|---|---|---|---|
| 0 | 0 | 0 | 1 | $\overline{R2000}$ |
| 1 | 0 | 0 | 1 | $\overline{R2001}$ |
| 0 | 0 | 0 | 0 | $\overline{W2000}$ |
| 1 | 0 | 0 | 0 | $\overline{W2001}$ |

The outputs of the counter interface address the counter chain 72 to read the contents of the chain and to reset the chain. See FIG. 3. The read and reset operations are described in greater detail hereinafter.

During the ROLL interrupt routine, the TURN counter in RAM 62 is incremented one count. The HEX addresses $\overline{R2000}$ and $\overline{R2001}$ are sequentially transferred via counter interface 56 to enable a pair of tri-state driver circuits 96 and 98 in circumference counter circuit 52. See FIG. 3. Circuit 96 comprises eight tri-state drivers each of which is associated with one of the eight (QA-QD) outputs of counters 76 and 78. Circuit 98 comprises four tri-state drivers each of which is associated with one of the four (QA-QD) outputs of counter 80. When the $\overline{R2000}$ address is generated, circuit 96 transmits the QA-QD outputs of counters 76 and 78 to the microprocessor. When the R2001 address is generated, circuit 98 transfers the QA-QD outputs of counter 80 to the microprocessor. Thus, after the first revolution of the roll, the contents of counter chain 72 are transferred in two successive addressing steps over the data bus D0-D7 to the microprocessor. The contents of the counter chain are stored in RAM 62. The contents of the counter chain represent the length of web unwound from the roll during the first revolution.

During the second revolution of the roll, the optical encoder pulses continue to increment counter chain 72. The counter chain is not reset until the completion of 16 revolutions of the roll. When the second revolution is completed, a M1 pulse again triggers an $\overline{IRQ}$ signal at the interrupt interface 60. See FIG. 5. The $\overline{IRQ}$ signal causes the microprocessor to enter the ROLL interrupt routine. The TURN counter in RAM 62 is incremented another count to indicate to the microprocessor that the second revolution of the roll has been completed. The contents of the counter chain 72 are not inspected at the end of the second revolution. The counter interface 56 is not addressed. And the tri-state driver circuits 96 and 98 remain disabled. The microprocessor ignores the state of the counter chain 72.

As the running roll continues to turn, the end of each revolution is marked by a M1 pulse. Each M1 pulse triggers an $\overline{IRQ}$ signal at the interrupt interface 60. Each $\overline{IRQ}$ signal causes the microprocessor to enter the ROLL interrupt routine. During the routine, the TURN counter in RAM 62 is incremented one count to keep track of the number of revolutions of the roll. Counter chain 72 is continuously incremented by the encoder pulses. But the microprocessor ignores the state of the counter chain for all revolutions of the roll up to and including the 16th revolution.

At the end of the 16th revolution of the roll, the microprocessor reads the contents of counter chain 72, stores the contents in RAM 62, and resets the counter chain and the TURN counter. Specifically, at the end of the 16th revolution, a M1 pulse causes the interrupt interface 60 to generate an $\overline{IRQ}$ signal. See FIG. 5. The microprocessor enters the ROLL interrupt routine. The microprocessor resets the Turn counter and addresses counter interface 56. The interface generates the $\overline{R2000}$ and $\overline{R2001}$ signals in sequence. See FIG. 4. The tri-state driver circuits 96 and 98 sequentially transfer the contents of counter chain 72 to the microprocessor via the data bus D0-D7. See FIG. 3. The contents of the counter chain are stored in RAM 62. See FIG. 2. The contents of the counter chain represent the total accumulation of optical encoder pulses generated during the 16 revolutions of the roll.

After the contents of the counter chain are read, the microprocessor resets the counter chain. The microprocessor again addresses the counter interface 56. The interface sequentially generates the $\overline{W2000}$ and $\overline{W2001}$ addresses. See FIG. 4. The $\overline{W2000}$ and $\overline{W2001}$ addresses control the load inputs of the counter chain 72. See FIG. 3. When the addresses are generated, the microprocessor outputs a zero byte on the data bus D0-D7. The data bus is connected to the A-D inputs of counters 76, 78 and 80. Accordingly, the load addresses $\overline{W2000}$ and $\overline{W2001}$ load the counter chain 72 to the zero or reset condition. At the start of the 17th revolution, the counter chain begins a fresh count of encoder pulses.

At the end of the 17th revolution of the roll, the microprocessor enters the ROLL interrupt routine in response to a M1 pulse, increments the TURN counter one count, reads the contents of the counter chain, and stores the contents in RAM 62 all as previously described in connection with the first revolution of the roll. In addition, the microprocessor performs a base computation of the length L of web remaining on the roll according to the following algorithm:

$$L = \frac{8(U_p^2 - C_0^2)}{U_1 - U_{17}}$$

where $U_p = [(U_{16})/16] - (U_1 - U_{17})/2$; $U_{16}$ is the count accumulated in counter chain 72 at the end of the 16th revolution of the roll; $U_1$ is the count after the first revolution of the roll; $U_{17}$ is the count after the 17th revolution of the roll; and $C_0$ is the circumference of the core of the roll. The quantity $C_0$ is a constant which may be stored in ROM 64 and is read out of the ROM during the computation of the above algorithm. Preferably, however, the constant $C_0$ is a switch input since the circumference of the core may vary from roll to roll.

The control system 44 performs the base computation of remaining web length L after the first 17 revolutions of the running roll. Thereafter, the computation is updated after each revolution of the roll. At the end of the 17th revolution, the base computation L is stored in RAM 62 for use during the next revolution of the roll. Additionally, the average rate of change in the length of web Δ unwound from the roll is also computed and stored in RAM 62. The computed average rate of change Δ is used to update the base computation L for each of the next 15 revolutions. The average rate of change Δ computed at the end of the 17th revolution is given by:

$$\Delta 17 = (U_1 - U_{17})/16$$

At the end of each of the next 15 revolutions, revolutions 18-32, the base quantity $U_p$ is updated by subtracting the average rate of change computed at the end of the 17th revolution. The computed length of web L' remaining on the roll is also updated after each of the 18th-32nd revolutions by substracting the updated value of $U_p$ from the base computation L and made at the end of the 17th revolution.

The computation of the average rate of change Δ is repeated as described above for each succeeding set of 17 revolutions of the roll wherein the 17 th revolution of each set is also regarded as the first revolution of the next set. At the end of the 16th revolution of each set, the counter chain and TURN counter are reset to zero. At the end of every revolution, the quantity $U_p$ is updated by subtracting the average rate of change Δ computed in the preceding set of 17 revolutions. The computation of the length of web remaining on the roll is also updated at the end of each revolution as described above. The computations are summarized for the first 4 sets of revolutions in Table 2 below.

Table 2

| Revolutions of Roll | Number of Sets | Average Rate of Change Δj* | Length of Web L Remaining on Roll |
|---|---|---|---|
| 1-17 | 1 | $\Delta 17 = (U_1 - U_{17})/16$ | $L(\text{base}) = \dfrac{8(U_p^2 - C_0^2)}{(U_1 - U_{17})}$ |
| 17-33 | 2 | $\Delta 33 = (U_{17} - U_{33})/16$ | $U_p(17) = U_{16}/16 - 8\Delta 17$<br>$L' = L - U_p'(K)**$ |
| 33-49 | 3 | $\Delta 49 = (U_{33} - U_{49})/16$ | $U_p'(K) = U_p'(K - 1) - \Delta 17$<br>$L' = L - U_p'$ |
| 49-65 | 4 | $\Delta 65 = (U_{49} - U_{65})/16$ | $U_{p'}(K) = U_p'(K - 1) - \Delta 33$<br>$L' = L - U_p'$<br>$U_p'(K) = U_p'(K - 1) - \Delta 49$ |

*compouted after the jth revolution of the roll. The jth revolution is the last revolution in each set of 17 revolutions. Thus j = 17, 33, 49, 65 . . .
**$U_p'(K)$ is the updated value of $U_p$ after the Kth revolution where K = 18, 19, 20, . . .

The updated value of the length of remaining web L' is compared to a software limit stored in ROM 64 after each revolution of the roll. When the updated value drops below the software limit, the microprocessor addresses a control circuit 68 and transfers data D0-D7 to the circuit to indicate this condition. The control circuit may comprise suitable decoding logic to enable the circuit to generate a control signal in response to the address and data transmitted by the microprocessor. The control signal operates a device associated with the unwinding roll. In one application of the invention, the control circuit 68 is a splice control circuit. The splice control circuit generates a control signal which causes the splicer apparatus 22 to splice the running and ready webs.

Software Expansion Of The Capacity Of Counter Chain 72

Figure 3:
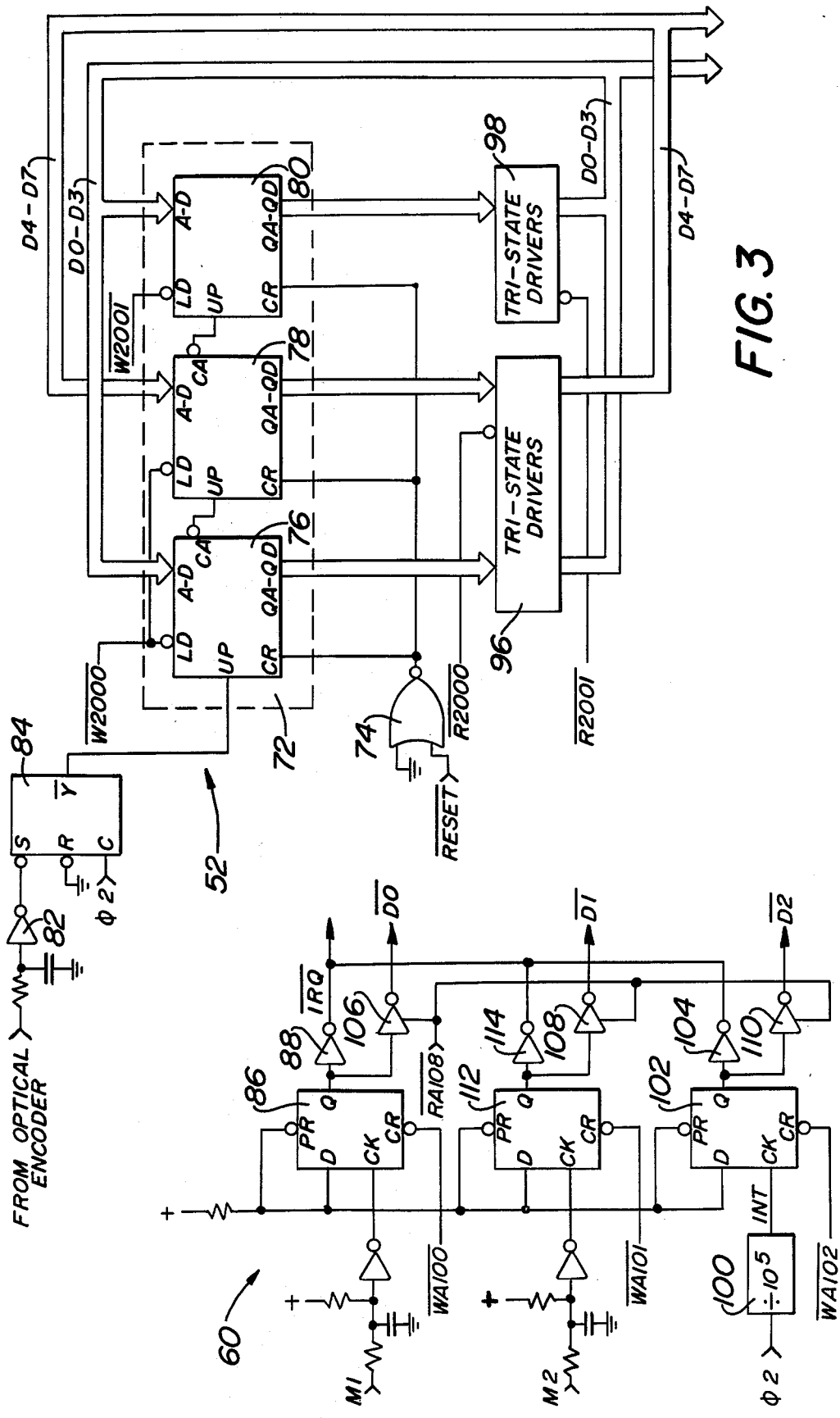
FIG. 3 is a block diagram of the circumference countercircuit.

The counter chain 72 must be able to accommodate the expected maximum number of optical encoder pulses generated during a base computation of remaining web length L. As shown in FIG. 3, the counter chain may comprise three cascaded four bit counters to provide a 12 bit count capacity. A 12 bit counter may not be able to accommodate the expected maximum number of encoder pulses generated during a base measurement of remaining web length. For example, assuming that an average of 15 feet of web is unwound from the running roll per revolution of the roll, an optical encoder which generates 500 pulses per foot of web will supply approximately 120,000 pulses during the first 16 revolutions of the roll required to effect a base measurement of the length of web remaining on the roll. The 12 bit counter, however, has a maximum count of $2^{12} = 4096$. The capacity of the 12 bit counter would have to be increased to accommodate the expected number of optical encoder pulses. An eight bit hardware counter could be connected to cascade with the 12 bit counter to provide a counter having a 20 bit capacity. The 20 bit counter would be able to accommodate the expected maximum number of optical encoder pulses.

Although the capacity of the counter chain can be extended by cascading multiple bit hardward counter stages, the use of additional hardware is relatively costly. Moreover, once the additional hardward stages are connected to the counter chain, the capacity of the counter chain again becomes fixed. The counter chain cannot be conveniently modified thereafter to cope with further increases in the number of optical encoder pulses generated during a base measurement of remaining web length.

In the preferred embodiment of the invention described herein, the capacity of the counter chain is expanded simply and efficiently by utilizing the microprocessor architecture itself. No hardware stages need be appended to the counter chain. The programmed microcomputer itself is employed to simulate the operation of additional hardware counter stages to expand the capacity of the counter chain.

The 12 bit counter chain 72 is expanded to a 20 bit counter chain by allocating a byte of memory in RAM 62 as an AUXILIARY counter. See FIG. 2. The AUXILIARY counter is incremented whenever the hardware counter chain 72 overflows. Overflow of the counter chain is detected by the microprocessor.

The microprocessor scans the four most significant bits of the counter chain at regular intervals of time in response to a timed interrupt signal INT generated at the interrupt interface 60. See FIG. 5. The microprocessor clock 2 is divided down by a frequency divider circuit 100. The frequency divider circuit divides down the 2 clock from 1 Mhz to a 10 Hz pulse train on the INT line. The INT signal triggers a D-type edge triggered flip-flop 102 at the 10 Hz rate. The flip-flop generates an $\overline{IRQ}$ signal at the same 10 Hz rate via inverter 104. Inverter 104 may be a TI 7405 inverter with open-collector output.

In response to the $\overline{IRQ}$ signal, the microprocessor enters the TIME interrupt routine wherein the four bits of counter 80 are compared to their value stored during the last TIME interrupt routine caused by the INT signal. If the capacity of the counter chain exceeds the expected maximum number of optical encoder pulses, the last four bits of the counter chain will continuously increase in value as the chain is incremented by the encoder pulses. If, however, the capacity of the counter chain is less than the expected maximum number of encoder pulses, the counter chain may overflow during one of the revolutions of the running roll. As a result, the last four bits of the counter chain will return to zero and then increase in value.

The transition through the zero count is detected by the microprocessor by comparing the values of the four bits of counter 80 for consecutive TIME interrupt routines. If the value of the four bits for any one TIME interrupt routine is less than the value for the preceding TIME interrupt routine, it indicates a transition through the zero count caused by an overflow of the counter chain. When the transition is detected, the microprocessor increments the AUXILIARY counter in RAM 62 by one count. The AUXILIARY counter, therefore, serves as an additional counter stage for chain 72 under software control. If overflow of the counter chain should recur, the microprocessor will detect the condition and increment the AUXILIARY counter to accommodate the encoder pulses in excess of the hardware counter chain capacity. At the end of the 16th revolution of each set, the AUXILIARY counter is reset to zero along with hardware counter chain 72 as already described.

The four bits of counter 80 are also inspected by the microprocessor whenever the microprocessor enters a ROLL interrupt routine after the first or the next to last revolution of the running roll in each set of 17 revolutions of the roll. The ROLL interrupt routine for the first and next to last revolutions in each set are the ROLL interrupt routines for which the contents of the counter chain 72 and the AUXILIARY counter are stored in RAM 62. The counter chain may overflow immediately prior to entering these ROLL interrupt routines. The counter chain will then indicate a spurious value. That value will be stored in RAM 62 during the first or next to last ROLL interrupt routine in each set unless the overflow is detected and the AUXILIARY counter incremented.

Accordingly, during the ROLL interrupt routine for the first and next to last revolutions in each set, the value of the four bits of counter 80 is compared by the microprocessor to the value for the immediately preceding TIME interrupt routine. If the comparison indicates overflow, that is, a transition through the zero count, the AUXILIARY counter is incremented one count. Thereafter, the contents of the counter chain 72 and the AUXILIARY counter are stored in RAM 62 an accessed as previously described in computing the length of web unwound from the running roll and the average rate of change in the length of web unwound per revolution of the roll.

The repetition rate of the INT pulses is much greater than the repetition rate of the M1 or M2 pulses generated by the running and ready rolls. The microprocessor will therefore inspect the last four bits of the counter chain at a much greater rate than the rate of revolution of the roll. For the embodiment described herein, it is assumed that the counter chain cannot overflow more than once per revolution of the roll. The rate of revolution of the roll is assumed to be well below ten revolutions per second. Accordingly, a 10 Hz INT signal will enable detection of an overflow condition during any revolution of the roll. Of course, the frequency of the INT signal can be varied from 10 Hz as a function of the rate of revolution of the roll to ensure that the counter chain does not overflow more than once per revolution of the roll and that the overflow will always be detected.

Interrupt Poll

The microprocessor 54 enters interrupt routine Roll or Time depending on the value of the truncated word $\overline{D0}$-$\overline{D2}$ generated by the interrupt interface 60. See FIG. 5. the truncated word is inverted and fed over the data bus D0-D7 to the microprocessor. If the truncated word indicates that the $\overline{IRQ}$ signal was generated in response to the M1 or M2 signals (generated by the sensors 46 or 48 respectively), the microprocessor enters the ROLL interrupt routine wherein the TURN counter is incremented and, if the TURN counter is at 1 or 16, the circumference counter circuit is sampled and the current value of the last four bits of the counter chain is compared to the value of the bits during the last interrupt caused by the INT signal.

If the $\overline{IRQ}$ signal is generated in response to the INT signal, the truncated word causes the microprocessor to enter the TIME interrupt routine wherein the current value of the last four bits of the counter chain is compared to the value of the bits during the last interrupt caused by the INT signal. The source of the interrupt is indicated by the code in Table 3 below.

Table 3

| Source | $\overline{D0}$ | $\overline{D1}$ | $\overline{D2}$ |
|--------|-----|-----|-----|
| M1 | 0 | 1 | 1 |
| M2 | 1 | 0 | 1 |
| INT | 1 | 1 | 0 |

The truncated word $\overline{D0}$-$\overline{D2}$ also enables the microprocessor to discriminate against spurious pulses which may be generated on the M2 line due to unwanted movement of the ready roll. Spurious M2 pulses can trigger flip-flop 112. See FIG. 5. This causes a spurious $\overline{IRQ}$ signal to appear at the open-collector output of inverter 114.

The microprocessor uses a flag bit in the condition code register to avoid entering an interrupt routine in response to spurious pulses from the ready roll. When power is first applied to the system, the microprocessor sets the flag bit in the condition code register. Thereafter, the microprocessor will enter an interrupt routine with the flag bit set only if the truncated word $\overline{D0}$-$\overline{D2}$ is 011 or 110. See Table 3 above. If the truncated word is 101 when the bit is set, the processor will ignore the $\overline{IRQ}$ signal and will not enter an interrupt routine.

If a splice of the running and ready webs is effected, the running roll will come to rest and the ready roll will begin to unwind. Revolutions of the new unwinding roll will be indicated by pulses on the M2 line. The truncated word $\overline{D0\text{-}D2}$ will then enable the microprocessor to avoid entering an interrupt routine in response to spurious pulses on the M1 line. This is accomplished by toggling the flag bit in the condition code register to reset the bit. The microprocessor will then enter an interrupt routine in response to an $\overline{IRQ}$ signal only when the $\overline{D0\text{-}D2}$ word is not 011. See Table 3 above.

Figure 6:
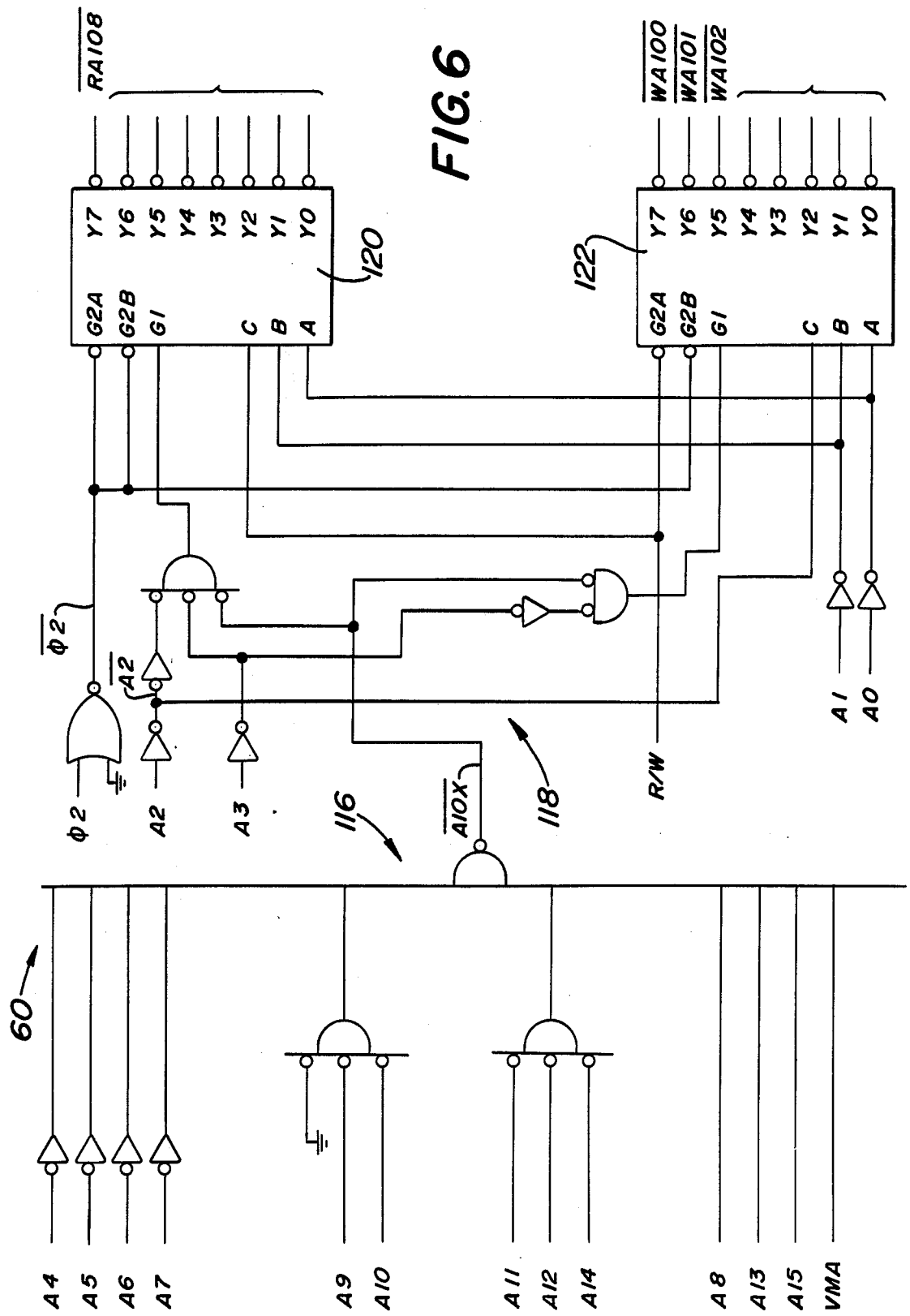

The portion of the interrupt interface 60 which controls the sequence in which the $\overline{IRQ}$ signal and the truncated word $\overline{D0\text{-}D2}$ are generated is shown in FIG. 6. Gating logic circuits 116 and 118 drive a pair of decoders 120 and 122 in response to the A0-A15 address bus, the VMA and R/W signals and the clock 2. Gating logic 116 detects the HEX address $\overline{A10X}$, X denoting a don't care symbol for the four address bits A0-A3. The gating logic circuit 118 operates decoders 120 and 122 to generate the HEX outputs $\overline{RA108}$, $\overline{WA100}$, $\overline{WA101}$ and $\overline{WA102}$. The operation of the portion of the interrupt interface circuit shown in FIG. 6 is summarized below in Table 4.

Table 4

| A0 | A1 | A2 | A3 | R/W | Output (Hex) |
|----|----|----|----|-----|--------------|
| 0  | 0  | 0  | 1  | 1   | $\overline{RA108}$ |
| 0  | 0  | 0  | 0  | 0   | $\overline{WA100}$ |
| 1  | 0  | 0  | 0  | 0   | $\overline{WA101}$ |
| 0  | 1  | 0  | 0  | 0   | $\overline{WA102}$ |

When an $\overline{IRQ}$ signal is received by the microprocessor, the microprocessor addresses the gating logic circuits 116 and 118 to cause decoders 120 and 122 to generate the $\overline{RA108}$ signal. See FIG. 6. This signal enables the tri-state inverters 104, 106 and 108 to generate the truncated word $\overline{D0\text{-}D2}$. See FIG. 5. The microprocessor inspects the truncated word to determine whether the $\overline{IRQ}$ signal was generated in response to an INT signal. See FIG. 3 above. If the truncated word indicates that the $\overline{IRQ}$ signal was not generated in response to the INT signal, the microprocessor checks the flag bit in the condition code register to determine whether the $\overline{IRQ}$ signal was generated by a spurious pulse on the M1 or M2 line.

If it is determined that the $\overline{IRQ}$ signal was generated in response to the INT signal, the microprocessor enters the TIME interrupt routine. The last four bits of the counter chain 72 are then inspected. If it is determined that the $\overline{IRQ}$ signal was generated in response to a valid M1 or M2 pulse, the microprocessor enters the ROLL interrupt routine. The TURN counter is incremented and, if the TURN counter is at a 1 or 16, the counter chain 72 and AUXILIARY counter are sampled.

Before leaving either interrupt routine, the microprocessor addresses the gating logic circuits 116 and 118 to cause decoders 120 and 122 to generate the $\overline{WA100}$, $\overline{WA101}$ or $\overline{WA102}$ signals. See FIG. 6. The $\overline{WA100}$ signal is generated to clear flip-flop 86 if the $\overline{IRQ}$ signal was generated in response to a M1 pulse. The $\overline{WA101}$ signal is generated to clear flip-flop 112 if the $\overline{IRQ}$ signal was generated in response to a M2 pulse. The $\overline{WA102}$ signal is generated to clear flip-flop 102 if the $\overline{IRQ}$ signal was generated in response to an INT pulse. Thereafter, the interrupt interface 60 is ready to transmit the next $\overline{IRQ}$ signal to the microprocessor to execute the next interrupt routine.

Display Data

The display 66 is addressed by the microprocessor via bus A0-A15 after each computation of the length of web remaining on the unwinding roll. The computed length of web remaining on the roll is transmitted via data bus D0-D7 to the display. The display converts the data to BCD format to display the computed length in conventional decimal notation. Conventional 7 segment LEDs may be used to display the BCD data.

The display 66 may also include a separate set of LEDs for the purpose of displaying the grade of the web material being unwound from the roll. The average rate of change $\Delta$ in the length of web unwound from the roll is computed as previously described for each set of 17 revolutions of the roll. The average rate of change $\Delta$ is an index of the thickness or grade of the web material. The thicker the web material, the greater will be the average rate of change $\Delta$.

A set of values of paper grade can be stored in ROM 64 and displayed by display 66 based on the computed average rate of change $\Delta$. After each computation of the average rate of change, the microprocessor compares the computed value to a group of sets of upper and lower software limits in the program. Each set of upper and lower limits defines a range of thicknesses corresponding to a grade of web material. A particular value of paper grade is read out of the ROM based on the results of the comparison. The value of paper grade is transmitted to display 66 via the data bus D0-D7.

An advantage of the invention is that it effects fully automatic monitoring of the level of web material on the unwinding roll. The invention is extremely flexible. The capacity of the hardware counter chain can be expanded to accomodate varying roll speeds and encoder pulse repetition frequencies by slight alteration of the program. One or more bytes of the RAM can be utilized to count the number of times that the hardware counter chain overflows. The computations of average change in web length and length of web remaining on the roll are made rapidly and accurately. The modular system architecture greatly facilitates installation and repair.

Although the invention has been described in terms of an unwinding roll of liner 20 and an optical encoder driven off the output shaft of a single facer, it should be obvious that the invention can also be practiced to determine the length of medium 34 on the unwinding roll 30 using the same optical encoder. Since, however, the medium 34 is corrugated at the single facer machine, the optical encoder would be sensing the length of fluted web while roll 30 would be unwinding unfluted web. The disparity between the quantities can be easily compensated by using a conversion factor based on the take-up ratio at the single facer machine. The conversion factor can be stored in ROM 64 and can be multiplied by the contents of the hardware counter chain 72 to provide an indication of remaining length of unfluted web on roll 30.

Additionally, although the invention has been described in terms of a hardware counter chain 72 either alone or in combination with the software or AUXILIARY counter, it should be obvious that the hardware counter chain could be replaced entirely by a software counterpart. Thus, the RAM 62 could be used to accumulate the optical encoder pulses. The portion of the RAM employed for this purpose could be periodically inspected and reset as previously described in respect to the hardware counter chain. By resorting to a software counter, the number and cost of hardware components can be reduced. Nevertheless, it is preferred that a hardware counter chain or a combination of hardware and software be employed to count the optical encoder pulses since this provides the fastest system response.

Further, although the invention has been described in terms of a running roll and a ready roll, it should be obvious that the invention may be practiced in connection with any unwinding roll. For example, the invention can be practiced in connection with a first unwinding roll of web material and a second roll which is simultaneously being wound with the material drawn off the first roll.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for determining the length of web remaining on an unwinding roll, comprising:
    first means for generating a train of digital pulses representative of the length of web unwound per revolution of the roll;
    second means for monitoring the number of revolutions of the roll;
    third means operatively associated with said first and second means for accumulating successive counts of said pulses over a predetermined number of revolutions of the roll;
    fourth means operatively associated with said first, second and third means for computing the average change in the number of said pulses generated per revolution of the roll over a predetermined number of revolutions of the roll and for computing the length of web remaining on the roll after each revolution thereof based on said computed average change and the accumulated counts of said pulses.

2. The apparatus according to claim 1 wherein said third means comprises an addressable hardware counter chain.

3. The apparatus according to claim 1 wherein said fourth means includes a programmed microprocessor.

4. The apparatus according to claim 3 wherein said microprocessor includes means for detecting whether said computed length of web is less than a preselected length.

5. The apparatus according to claim 1 wherein said fourth means includes means for detecting overflow of said counter chain and a read/write memory for counting the number of times overflow of said counter chain is detected.

6. A control system for a mechanism operatively associated with an unwinding roll of web material, comprising:
    first means for measuring the length of web unwound per revolution of the roll;
    second means for monitoring the number of revolutions of the roll;
    third means operatively associated with said first and second means for summing the measurements of web length over a predetermined number of revolutions of the unwinding roll;
    fourth means operatively associated with said first, second and third means for computing the average change in the measurements of web length per revolution of the unwinding roll over a predetermined number of revolutions of the roll and for computing the length of web remaining on the roll after each revolution thereof based on said computed average change and the summed measurements of web length; and
    fifth means operatively associated with said fourth means for actuating the mechanism.

7. The control system according to claim 6 wherein said third means includes an addressable hardware counter chain.

8. The control system according to claim 6 wherein said fourth means includes a programmed microprocessor.

9. The control system according to claim 8 wherein said microprocessor includes means for detecting whether said computed length of web is less than a preselected length.

10. The control system according to claim 6 wherein said fourth means includes means for detecting overflow of said second means and a read/write memory for counting the number of times overflow of said second means is detected.

11. An automatic splice control system for a web splicer apparatus which includes at least one running web roll and one ready web roll and a splice mechanism for splicing the running web to the ready web, comprising:
    a sensor for generating a digital signal per revolution of the running roll;
    an encoder operatively associated with the running web for generating a train of digital pulses representative of the length of web unwound per revolution of the running roll;
    a counter operatively associated with said sensor and said encoder for accumulating successive counts of said encoder pulses over a predetermined number of revolutions of the running roll;
    a programmed microprocessor operatively associated with said counter for computing the average change in the number of said encoder pulses generated per revolution of the running roll over a predetermined number of revolutions of the roll and for computing the length of web remaining on the roll after each revolution thereof based on said computed average change and said accumulated count; and
    means operatively associated with said microprocessor for causing the splicer apparatus to initiate a splice sequence wherein the running web is spliced to the ready web.

12. The automatic splice control system according to claim 11 wherein said counter comprises an adjustable counter chain connected to said encoder and said microprocessor includes a random access memory for counting the number of times said counter chain overflows.

13. A method of determining the length of web remaining on an unwinding roll, comprising:
    generating a train of digital pulses representative of the length of web unwound per revolution of the roll;
    monitoring the number of revolutions of the roll;
    accumulating successive counts of said pulses over a predetermined number of revolutions of the roll;
    computing the average change in the number of said pulses generated per revolution of the roll over a predetermined number of revolutions of the roll; and
    computing the length of web remaining on the roll after each revolution thereof based on said computed average change and the accumulated counts of said pulses.

14. The method according to claim 13 including detecting whether said computed length of web is less than a preselected length.

15. A method of controlling a mechanism operatively associated with an unwinding roll of web material, comprising:
- measuring the length of web unwound per revolution of the unwinding roll;
- monitoring the number of revolutions of the roll;
- summing the measurements of web length over a predetermined number of revolutions of the unwinding roll;
- computing the average change in the measurements of web length per revolution of the unwinding roll over a predetermined number of revolutions of the roll;
- computing the length of web remaining on the roll after each revolution thereof based on said computed average change and the summed measurements of web length; and
- actuating the operating mechanism as a function of the computation of length of web remaining on the roll.

16. The method according to claim 15 wherein said actuating step includes detecting whether said computed length of web is less than a preselected length.

17. A method of controlling a web splicer apparatus which includes at least one running web roll and one ready roll and a splice mechanism for splicing the running web to the ready web, comprising:
- generating a digital signal per revolution of the running roll;
- generating a train of digital pulses representative of the length of web unwound per revolution of the running roll;
- accumulating successive counts of the pulses over a predetermined number of revolutions of the running roll;
- computing the average change in the number of the pulses generated per revolution of the running roll over a predetermined number of revolutions of the roll;
- computing the length of web remaining on the roll after each revolution thereof based on the computed average change and the accumulated counts of pulses; and
- causing the splicer apparatus to initiate a splice sequence wherein the running web is spliced to the ready web when said computed length of web is less than a preselected value.

* * * * *